(12) United States Patent
Lawson

(10) Patent No.: US 8,991,038 B2
(45) Date of Patent: Mar. 31, 2015

(54) ROBOTIC INDEXING STATION

(75) Inventor: Lawrence J. Lawson, Troy, MI (US)

(73) Assignee: Android Industries LLC, Auburn Hills, MI (US)

( * ) Notice: Subject to any disclaimer, the term of this patent is extended or adjusted under 35 U.S.C. 154(b) by 1223 days.

(21) Appl. No.: 12/553,497

(22) Filed: Sep. 3, 2009

(65) Prior Publication Data

US 2010/0051206 A1    Mar. 4, 2010

Related U.S. Application Data

(60) Provisional application No. 61/094,097, filed on Sep. 4, 2008.

(51) Int. Cl.
    *B23P 19/00*     (2006.01)
    *B60C 25/132*     (2006.01)
    *B60C 25/05*     (2006.01)

(52) U.S. Cl.
    CPC ......... *B60C 25/132* (2013.01); *Y10T 29/49494* (2015.01); *Y10T 29/53448* (2015.01); *B60C 25/0515* (2013.04); *B60C 25/0521* (2013.04); *B60C 25/0533* (2013.04); *B60C 25/0554* (2013.04); *B60C 25/0596* (2013.04)
    USPC ......................................... 29/802; 29/894.31

(58) Field of Classification Search
    CPC .............. B60C 25/132; B60C 25/0533; B60C 25/0554; B60C 25/0521; B60C 25/0515; Y10T 29/49494; Y10T 29/53448
    USPC ........ 29/894.31, 894, 894.351, 894.361, 802, 29/711, 795; 157/1.17, 1.1, 1.2, 1.26
    See application file for complete search history.

(56) References Cited

U.S. PATENT DOCUMENTS

| | | | |
|---|---|---|---|
| 5,826,319 A | | 10/1998 | Colwell et al. |
| 7,089,987 B2 | * | 8/2006 | Gonzaga .......................... 157/14 |
| 2005/0155719 A1 | | 7/2005 | Gonzaga |
| 2007/0000616 A1 | | 1/2007 | Rogalla et al. |
| 2008/0156447 A1 | * | 7/2008 | Lawson et al. ............... 157/1.24 |
| 2008/0163983 A1 | | 7/2008 | Cunningham |
| 2008/0185106 A1 | | 8/2008 | Farley et al. |

FOREIGN PATENT DOCUMENTS

| | | |
|---|---|---|
| CA | 2616275 A1 | 6/2008 |
| EP | 1564028 A1 | 8/2005 |

(Continued)

OTHER PUBLICATIONS

International Search Report for PCT/US2009/056021 mailed Apr. 20, 2010.
Office Action from Canadian Patent Office for application 2735655 dated Jun. 11, 2012.
Office Action from Canadian Patent Office for application 2735655 dated Aug. 23, 2013.

(Continued)

*Primary Examiner* — Ryan J Walters
(74) *Attorney, Agent, or Firm* — Honigman Miller Schwartz and Cohn LLP

(57) ABSTRACT

A single-cell workstation for processing a tire-wheel assembly including a tire and a wheel is disclosed. The single-cell workstation includes a mounting and indexing sub-station including a first plurality of tire engaging portions including one or more first tire-engaging surfaces, and a second plurality of tire engaging portions including one or more second tire-engaging surfaces.

16 Claims, 16 Drawing Sheets

(56) References Cited

FOREIGN PATENT DOCUMENTS

| | | |
|---|---|---|
| EP | 1942019 A1 | 7/2008 |
| GB | 2104460 A | 3/1983 |
| JP | 2002103933 A | 4/2002 |
| JP | 2004001745 A | 1/2004 |
| JP | 2006159972 A | 6/2006 |

OTHER PUBLICATIONS

Office Action from Mexican Patent Office for application MX/a/2011/002432 dated Oct. 8, 2013 (2 pages).

Supplementary European Search Report for application EP09812273 dated Jan. 18, 2012.

* cited by examiner

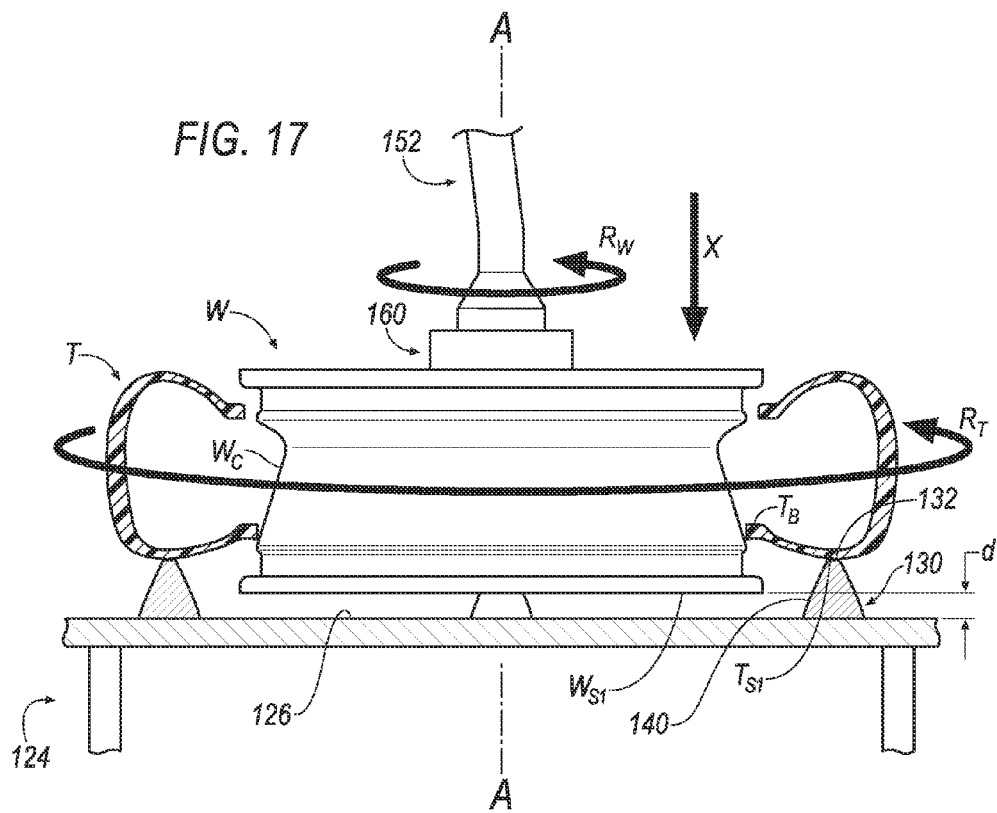
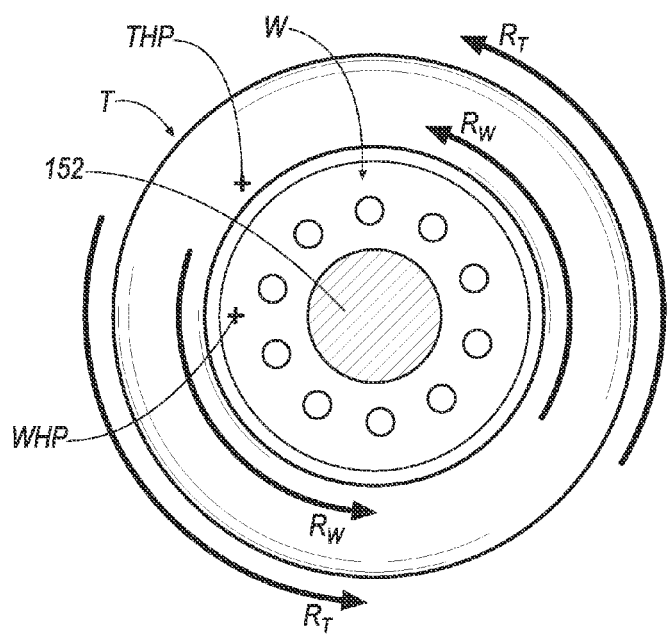

US 8,991,038 B2

ROBOTIC INDEXING STATION

RELATED APPLICATION

This disclosure claims priority to U.S. Provisional Patent Application Ser. No. 61/094,097 filed on Sep. 4, 2008.

FIELD OF THE INVENTION

The disclosure relates to tire-wheel assemblies and to a method and apparatus for processing a tire-wheel assembly.

DESCRIPTION OF THE RELATED ART

It is known in the art that a tire-wheel assembly is processed in several steps. Usually, conventional methodologies that conduct such steps require a significant capital investment and human oversight. The present invention overcomes drawbacks associated with the prior art by setting forth a device utilized for processing a tire-wheel assembly.

BRIEF DESCRIPTION OF THE DRAWINGS

The disclosure will now be described, by way of example, with reference to the accompanying drawings, in which:

FIG. 17 illustrates another partial cross-sectional view of the mounting and indexing substation and a tire attached to the robotic arm in accordance with an exemplary embodiment of the invention;

FIG. 18 illustrates another cross-sectional view of a portion of the robotic arm and a top view of the tire and a wheel in accordance with an exemplary embodiment of the invention;

DETAILED DESCRIPTION OF THE INVENTION

Figure 1:
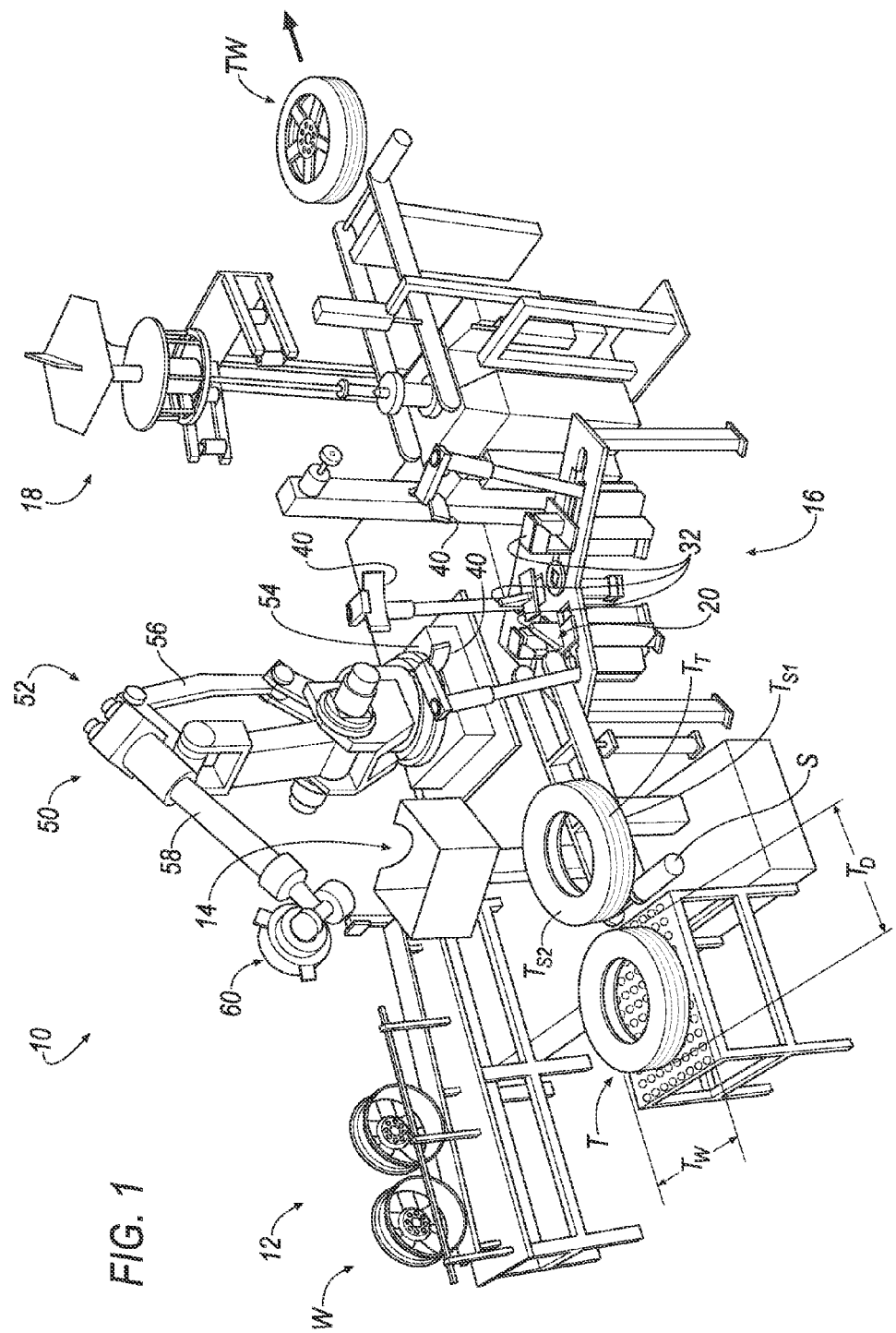
FIGS. 1-4 illustrate perspective views of an apparatus and method for processing a tire-wheel assembly in accordance with an exemplary embodiment of the invention.

The Figures illustrate an exemplary embodiment of an apparatus and method for processing a tire-wheel assembly in accordance with an embodiment of the invention. Based on the foregoing, it is to be generally understood that the nomenclature used herein is simply for convenience and the terms used to describe the invention should be given the broadest meaning by one of ordinary skill in the art.

In an embodiment, an apparatus shown generally at 10 in the FIGS. 1-4 may be referred to as a "single-cell" workstation. In the forgoing disclosure, it will be appreciated that term "single-cell" indicates that the workstation 10 provides a tire-wheel assembly, TW, without requiring a plurality of successive, discrete workstations that may otherwise be arranged in a conventional assembly line. Rather, the single cell workstation 10 provides one workstation having a plurality of subs-stations 12-18, each performing a specific task in the processing of a tire-wheel assembly, TW. As such, the novel single-cell workstation 10 significantly reduces the cost, investment and maintenance associated with a conventional tire-wheel assembly line located on a relatively large real estate footprint. Thus, capital investment and human oversight is significantly reduced when a single cell workstation 10 is employed in the processing of tire-wheel assemblies, TW.

In an embodiment, the single-cell workstation 10 includes a device 50. In operation, the device 50 interfaces with a wheel, W, in order to prepare a tire-wheel assembly, TW. The ability of the device 50 to interface with the wheel, W, eliminates the need to "hand-off" one or more of a wheel, W, and tire, T, to a subsequent workstation of a plurality of workstations in a conventional assembly line.

In an embodiment, the device 50 associated with the single-cell workstation 10 may include a robotic arm 52 that may be located in a substantially central position relative a plurality of sub-stations. In an embodiment, a plurality of sub-stations is shown generally at 12-18.

In operation, a wheel, W, is removably-attached to the robotic arm 52. In an embodiment, the robotic arm 52 interfaces with the wheel, W, throughout some or all of the steps associated with the preparation of the tire-wheel assembly, TW. In an embodiment, the robotic arm 52 may include, for example, a base portion 54, a body portion 56 connected to the base portion 54, an arm portion 58 connected to the body portion 56, and a claw portion 60 connected to the arm portion 58.

In an embodiment, the body portion 56 is rotatably-connected to the base portion 54 such that the body portion 56 may be pivoted 360° relative the base portion 54. Further, in an embodiment, the body portion 56 may be generally hinged to the base portion 54 having, for example, hinged, scissor-style arms such that the body portion 56 may be articulated vertically upward or downward relative the base portion 54.

In an embodiment, the arm portion 58 may be connected to the body portion 56 such that the arm portion 58 may be articulated in any desirable upward or downward position relative the body portion 56. Similar to the rotatable connection of the base portion 54 and body portion 56, the claw portion 60 may be rotatably-connected to the arm portion 58 such that the claw portion 60 may be rotated, pivoted or otherwise spun more or less than 360° relative the arm portion 58. In an embodiment, movement of the portions 54-60 may be controlled manually with a joystick (not shown), or, alternatively, automatically by way of logic stored on a controller having a processor (not shown).

In the following description, it will be appreciated that prescribed movements of the body portion 56 relative the base portion 54 may have occurred before, during or after movement of the arm portion 58 and/or claw portion 60. For example, the body portion 56 may have been rotated, articulated or the like in order to locate the arm and claw portions 58, 60 to a desired position at or proximate a particular sub-station.

Figure 2:
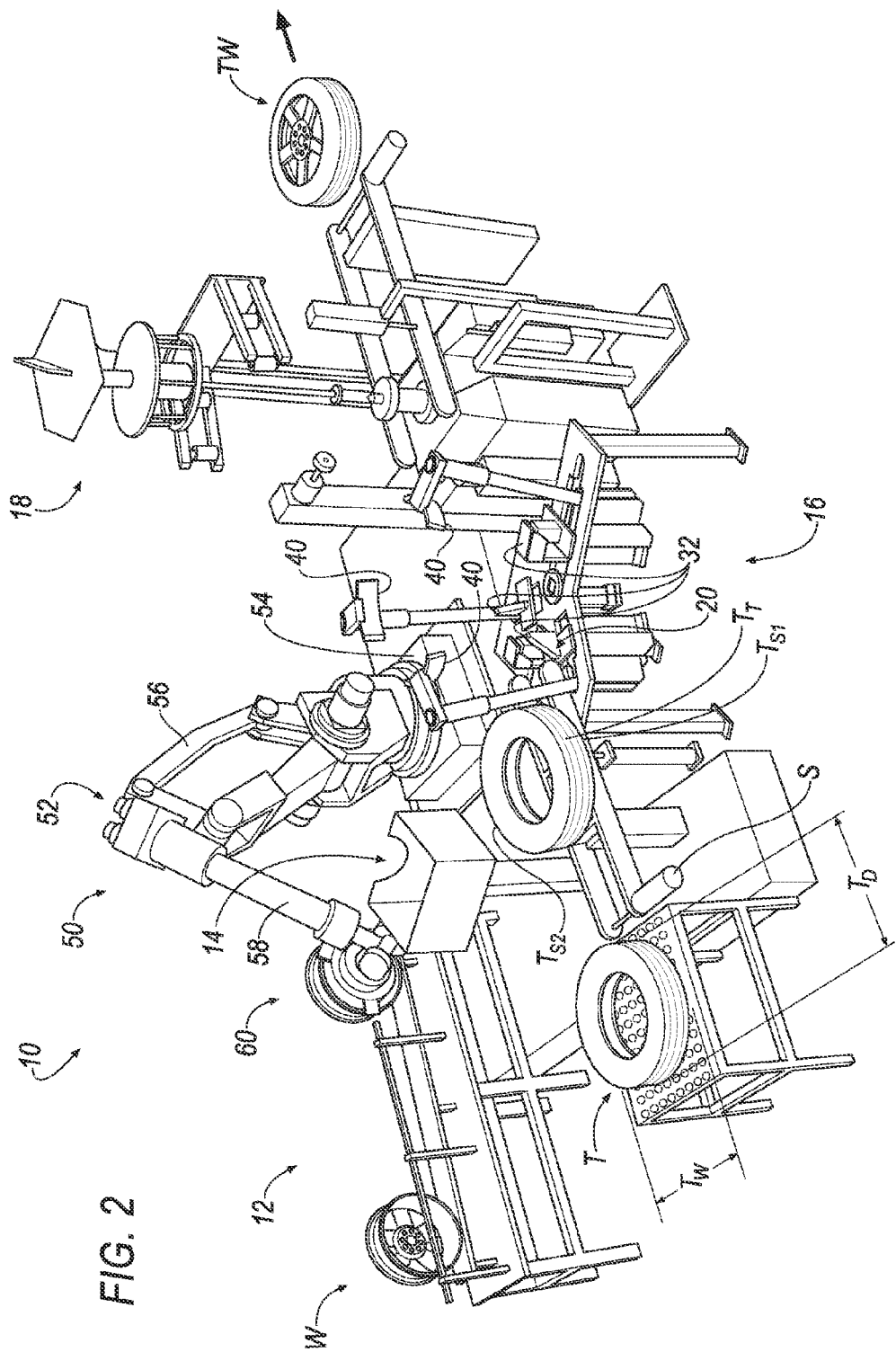
Figure 3:
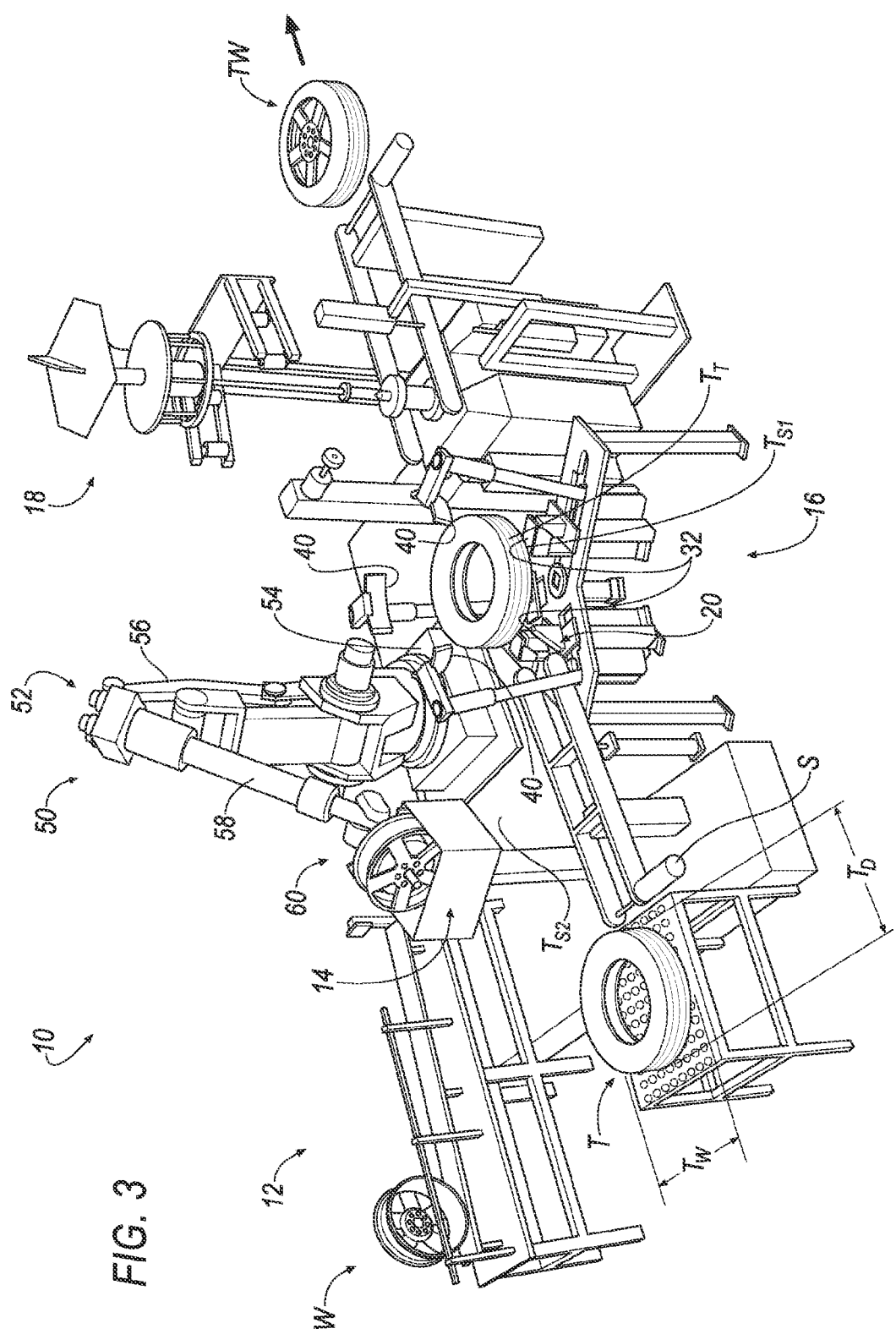

Regarding the general movement of the device 50 relative the sub-stations 12-18, in an embodiment, as seen in FIG. 2, the robotic arm 52 is manipulated such that it obtains a wheel, W, at a wheel repository sub-station 12. Then, in an embodiment, as seen in FIG. 3, the robotic arm 52 is articulated such that it lubricates/"soaps" the wheel, W, at a soaping sub-station 14. Then, in an embodiment, as seen in FIGS. 4-9, the robotic arm 52 is articulated such that it mounts the soaped wheel, W, to a tire, T, at a mounting and indexing sub-station 16 to define a non-inflated tire-wheel assembly. Subsequent to the mounting and indexing of the tire, T, and wheel, W, the robotic arm 52 locates the non-inflated tire-wheel assembly at an inflating sub-station 18 for inflating the non-inflated tire-wheel assembly; once inflated, an inflated tire-wheel assembly, TW, may be said to be formed. The inflated tire-wheel assembly, TW, may be discharged from the single-cell workstation 10 for further processing by a balancing sub-station or the like.

Figure 5:
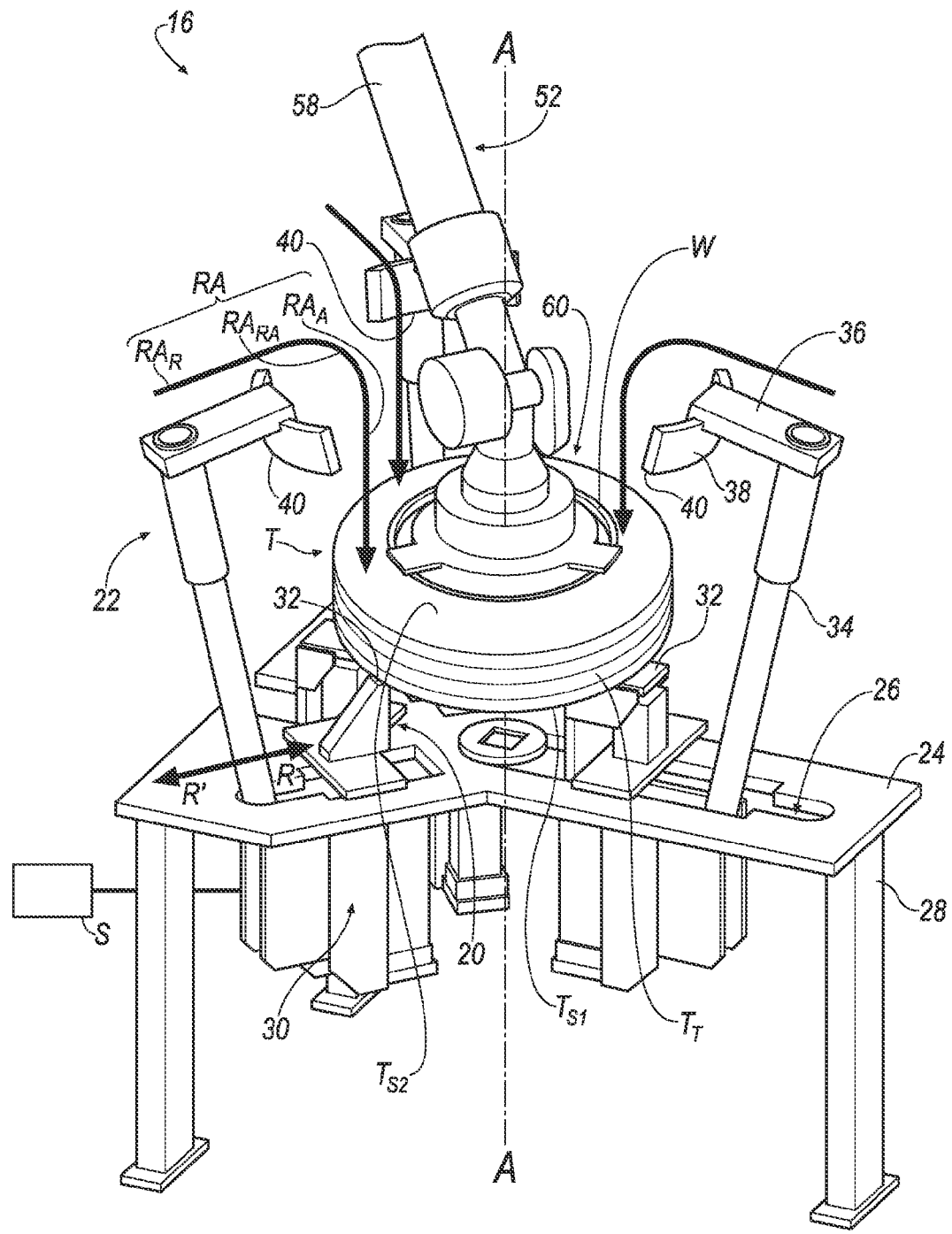
FIGS. 5-7 illustrate a sub-station of the apparatus method according to line 5 of FIG. 4 in accordance with an exemplary embodiment of the invention.

Referring now to FIG. 5, the mounting and indexing sub-station 16 is shown according to an embodiment. In general, the mounting and indexing substation 16 includes a first and second plurality of adjustable tire engaging portions, which are shown generally at 20 and 22. In an embodiment, the first plurality of tire engaging portions 20 may axially engage a first sidewall surface, $T_{S1}$, of the tire, T. In an embodiment, the second plurality of tire engaging portions 22 may axially engage a second sidewall surface, $T_{S2}$, of the tire, T, that is opposite the first sidewall surface, $T_{S1}$.

Although the first and second plurality of tire engaging portions 20, 22 are described to respectively engage the first and second sidewall surfaces, $T_{S1}$, $T_{S2}$, of the tire, T, it will be appreciated however, that the invention is not limited to the configuration/orientation of the first and second plurality of tire engaging portions shown at 20, 22 and that any desirable configuration/orientation of a tire engaging portion may be utilized, as desired. For example, in an embodiment, one or more of the first and second plurality of tire engaging portions 20, 22 may radially engage a circumferential/tread surface, $T_T$, of the tire, T, or, alternatively, in an embodiment, one or more of the first and second plurality of tire engaging portions 20, 22 may radially and axially engage the circumferential/tread surface, $T_T$, and one or more of the first and second sidewall surfaces, $T_{S1}$, $T_{S2}$, of the tire, T.

As seen in FIG. 5, in an embodiment, the first and second plurality of tire engaging portions 20, 22 are adjustable relative an axis, A-A. In an embodiment, the first plurality of tire-engaging portions 20 are radially adjustable relative the axis, A-A, according to the direction of arrows, R/R'. In an embodiment, the first plurality of tire-engaging portions 20 are radially adjustable prior to locating a tire, T, at the mounting and indexing sub-station 16 (see, e.g., FIGS. 1-2). Radial adjustment of the first plurality of tire engaging portions 20 in the direction of the arrows, R/R', may be conducted to accommodate any type of tire, T, defined by any diameter, which is shown generally at $T_D$ (see, e.g., FIG. 1) according to an embodiment.

In an embodiment, the mounting and indexing sub-station 16 may include or be interfaced with one or more sensors that detects the diameter, $T_D$, of the tire, T, such that the first plurality of tire engaging portions 20 may be automatically adjusted responsive to the detected diameter, $T_D$, of the tire, T. In an embodiment, a sensor is shown generally at S in FIGS. 1-7. However, in an alternative embodiment, the radial adjustment of the first plurality of tire engaging portions 20 may be conducted manually by an operator without utilizing a sensor, S.

In an embodiment, as seen in FIG. 5, the second plurality of tire-engaging portions 22 are adjustably-disposed relative the axis, A-A, in one or more directions according to the arrow, RA. In an embodiment, the arrow, RA, may include a radial segment, $RA_R$, an axial segment, $RA_A$, and a compounded, arcuate segment having a radial and axial component, which is shown generally at $RA_{RA}$.

Similar to the movement of the first plurality of tire engaging portions 20, adjustment of the second plurality of tire engaging portions 22 in the direction of the arrows, RA, may be conducted to accommodate any type of tire, T, defined by any diameter, $T_D$. In an embodiment, the sensor, S, that detects the diameter, $T_D$, of the tire, T, may also cause the second plurality of tire engaging portions 22 to be automatically adjusted responsive to the detected diameter, $T_D$, of the tire, T. In an embodiment, the adjustment of the second plurality of tire engaging portions 22 may be conducted manually by an operator without utilizing a sensor, S.

Figure 6:
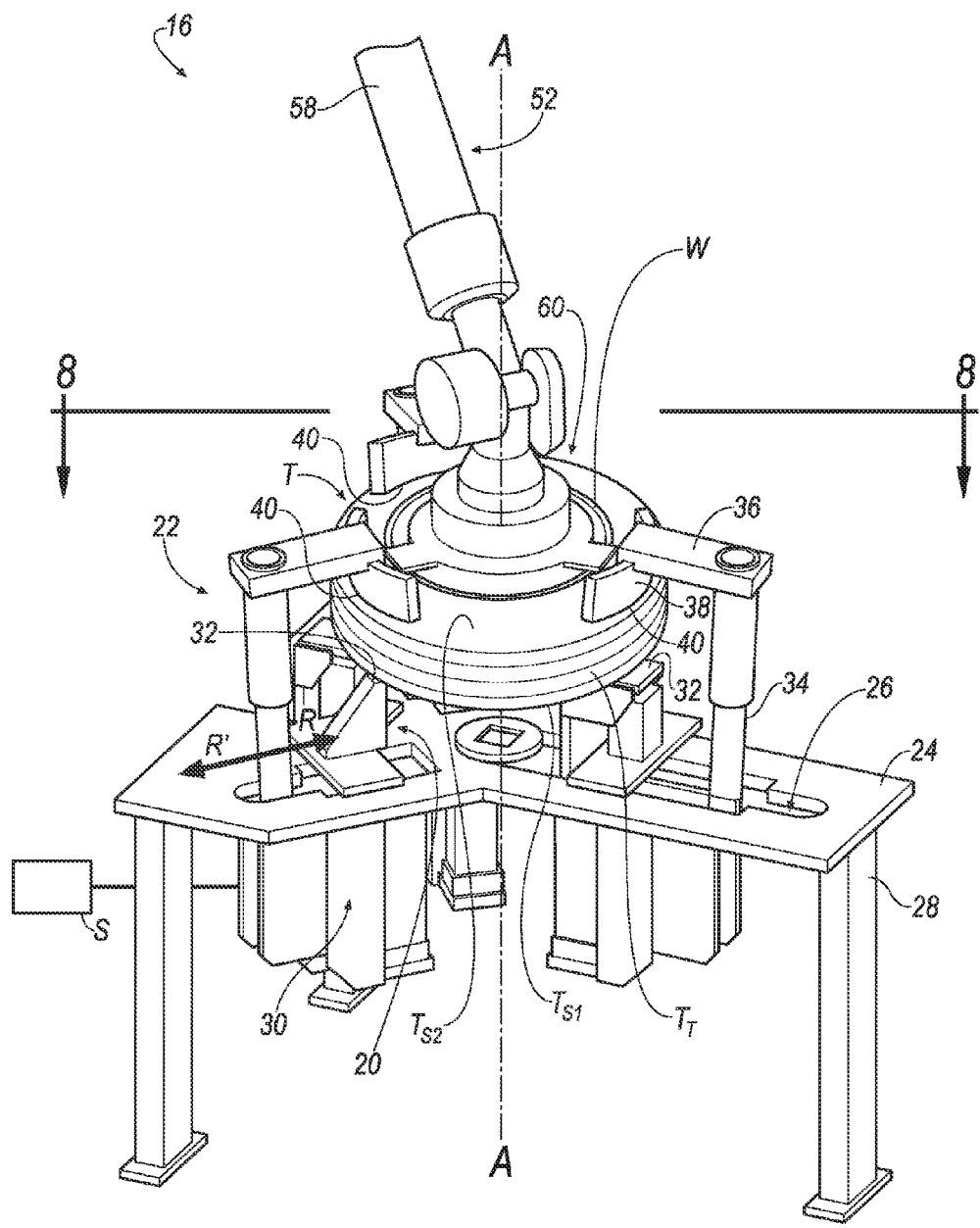
Figure 7:
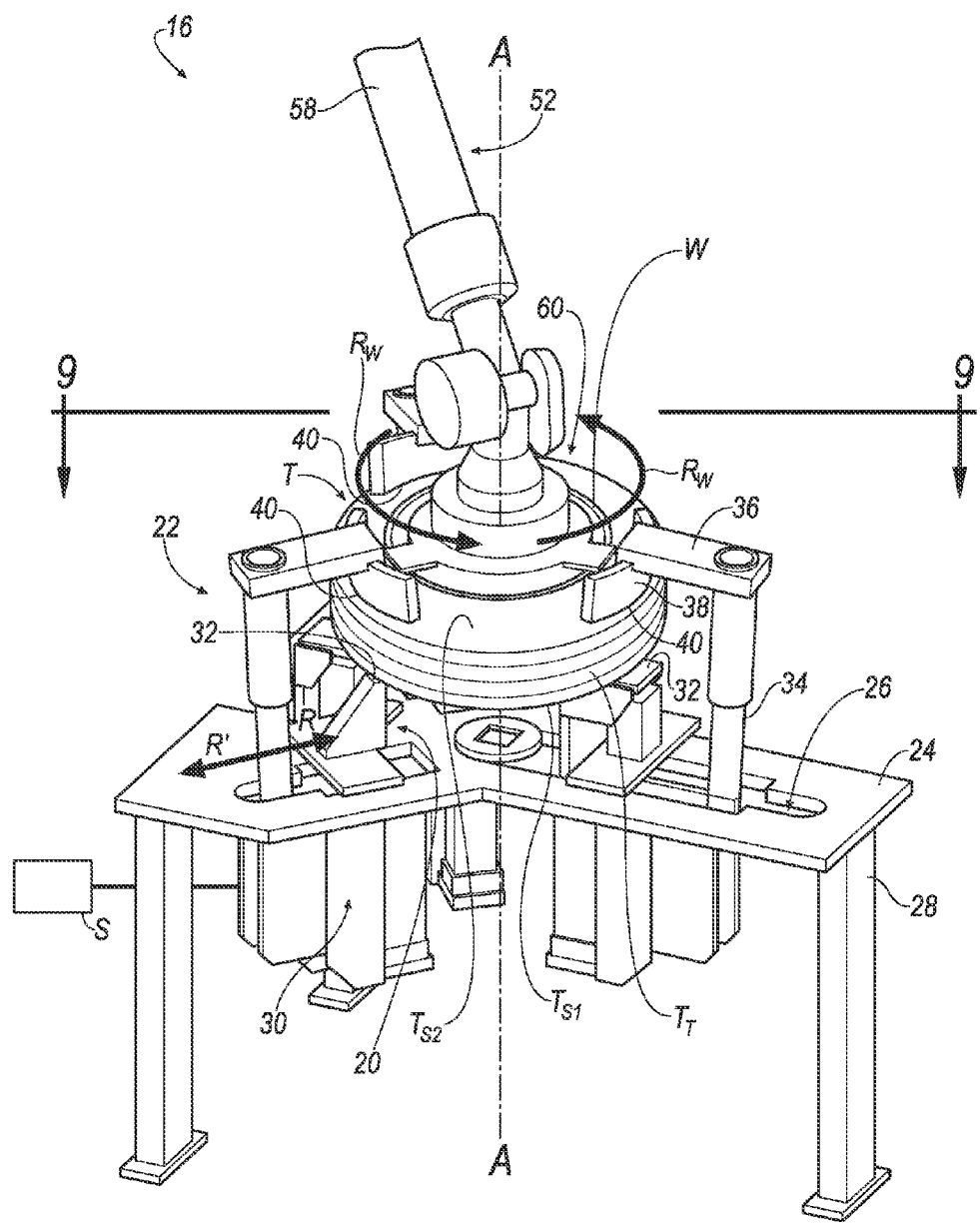

As seen in FIGS. 5-7, in an embodiment, the first and second plurality of tire engaging portions 20, 22 are movably-adjustable relative a platform 24. In an embodiment, the platform 24 may define a plurality of radially elongated openings 26. Further, in an embodiment, the platform 24 may be supported by a plurality of legs, which are shown generally at 28, such that one or more actuators 30 may be disposed underneath the platform 24.

In an embodiment, each of the first and second plurality of tire engaging portions 20, 22 are connected to the one or more actuators 30. In an embodiment, each of the tire engaging portions 20, 22 are connected to the one or more actuators 30 and extend through the plurality of elongated openings 26. In an embodiment, the one or more actuators 30 may be connected to the one or more sensors, S, such that the one or more sensors, S, provide instructions to the one or more actuators 30 for automatically controlling the adjustable movement of the first and second plurality of tire engaging portions 20, 22.

In an embodiment, the first plurality of tire engaging portions 20 are adjustably-disposed substantially adjacent the platform 24. In an embodiment, the second plurality of tire engaging portions 22 are adjustably disposed at a distance spaced away from the platform 24.

In an embodiment each engaging portion of the first plurality of tire engaging portions 20 generally defines a first engaging surface, which is shown generally 32 (see, e.g., FIGS. 1-2). In an embodiment, the first engaging surfaces 32 are disposed adjacent the first sidewall surface, $T_{S1}$, of the tire, T, when the tire, T, is moved to a processing position (see, e.g., FIG. 3) from a stowed position (see, e.g., FIG. 1).

In an embodiment, each engaging portion of the second plurality of engaging portions 22 includes an arm portion 34 extending from the one or more actuators 30, a head portion 36 connected to the arm portion 34 and an arcuate engaging portion 38 connected to the head portion 36. The arcuate engaging portion 38 generally defines a second engaging surface, which is shown generally at 40.

In an embodiment, the second engaging surfaces 40 are disposed adjacent the second sidewall surface, $T_{S2}$, of the tire, T, upon moving the tire, T, to the processing position. Further, in an embodiment, the first and second engaging surfaces 32, 40 are arranged in a substantially opposing relationship when the first and second engaging surfaces 32, 40 respectively engage the first and second sidewall surfaces, $T_{S1}$, $T_{S2}$, of the tire, T (see, e.g., FIG. 6).

Referring to FIGS. 5-9 a method for operating the mounting and indexing sub-station 16 is described. In an embodiment, as seen in FIGS. 1-3, the robotic arm 52 may obtain and subsequently lubricate/soap a wheel, W, at the soaping sub-station 14. Before, during or after the lubricating/soaping of the wheel, W, one or more characteristics relating to the shape/size of a tire, T, is determined, in an embodiment, by the one or more sensors, S.

In an embodiment, upon the sensor, S, determining the one or more characteristics of the tire, T, the sensor, S, may send data related to the one or more characteristics of the tire, T, to a processor associated with the one or more actuators 30 such that the one or more actuators 30 may be permitted to adjustably-manipulate the positioning of one or more of the first and second plurality of tire engaging portions 20, 22 for accommodating the determined size/shape of the tire, T.

Alternatively, in an embodiment, rather than utilizing a sensor, S, an operator (e.g., a person) may manually determine the one or more characteristics of the tire, T, by, for example, visually inspecting the tire, T. In an embodiment, the operator may determine the size/shape of the tire, T, and provide data pertaining to the size/shape of the tire, T, to the processor associated with the one or more actuators 30 by way of a data entry keypad terminal (not shown). As similarly explained above, data that is manually provided to the processor permits the one or more actuators 30 to adjustably-manipulate the positioning of one or more of the first and second plurality of tire engaging portions 20, 22 for accommodating the determined size/shape of the tire, T.

In an embodiment, a characteristic of the tire, T, that may be determined at the determining step is a diameter, $T_D$, of the tire, T. Further, in an embodiment, another characteristic of the tire, T, that may be determined at the determining step is a width/thickness, $T_W$ (see, e.g., FIGS. 1-4), of the tire, T; in an embodiment, the width/thickness, $T_W$, of the tire, T, may be utilized by the one or more actuators 30 for adjusting the second plurality of tire engaging portions 22.

Subsequent to the determining the diameter, $T_D$, of the tire, T, the first plurality of tire engaging portions 20 are moved according to the direction of the arrow, R, such that the first engaging surfaces 32 may be positioned for supportingly-engaging the first sidewall surface, $T_{S1}$, of the tire, T. Then, the tire, T, may be moved to the processing position (see, e.g., FIG. 3) such that the first sidewall surface, $T_{S1}$, of the tire, T, may be disposed adjacent the first engaging surfaces 32.

Figure 4:
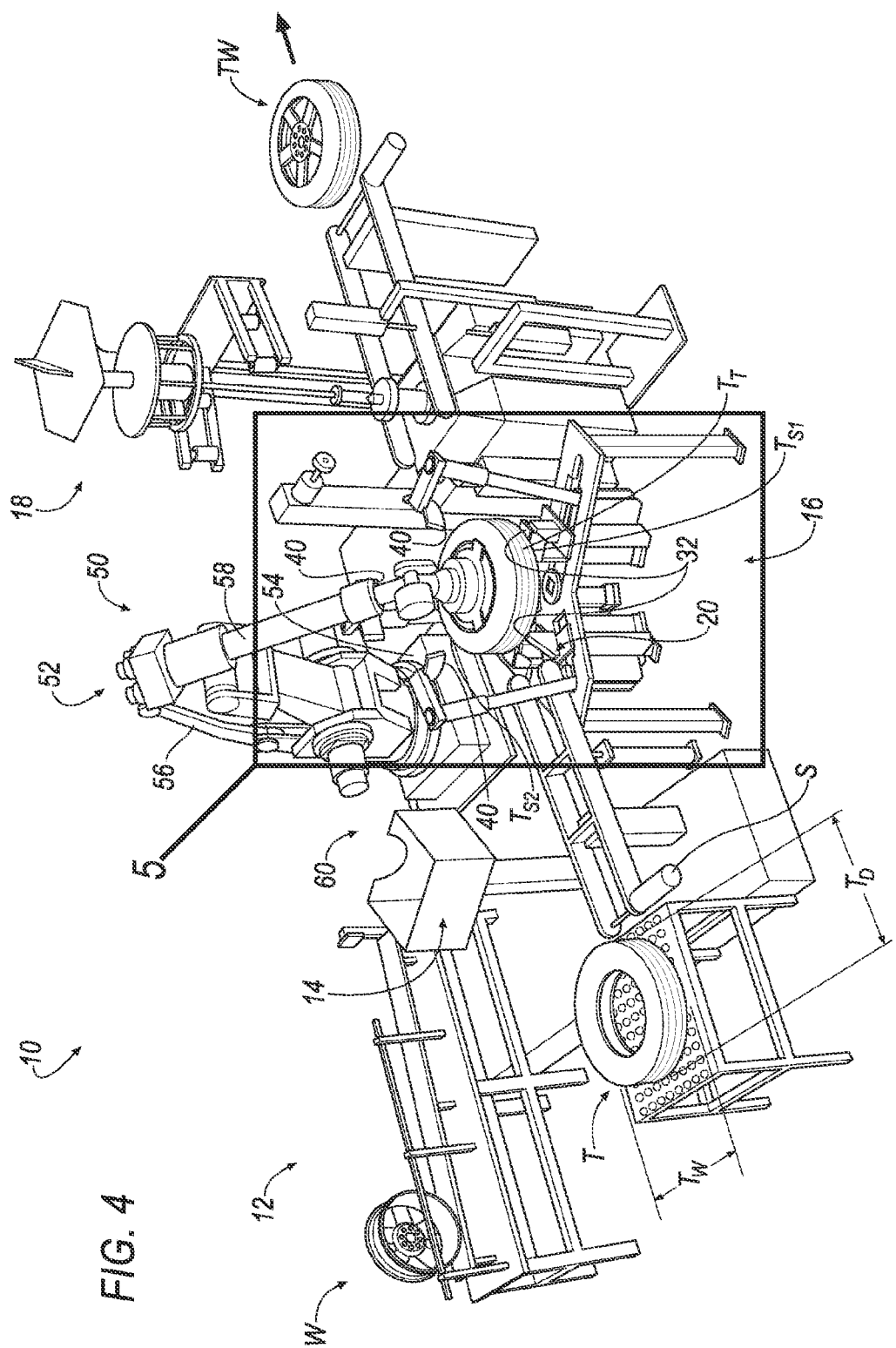

Then, as seen in FIGS. 4-5, the robotic arm 52 disposed the wheel, W, within a central opening defined by the tire, T, such that the tire, T, is circumferentially disposed about the wheel, W. Then, as seen in FIGS. 5 and 6, the second plurality of tire engaging portions 22 are moved according to the direction of the arrow, RA, such that the second tire engaging surfaces 40 are disposed adjacent the second sidewall surface, $T_{S2}$, of the tire, T.

Referring to FIG. 6, upon disposing the second tire engaging surfaces 40 adjacent the second sidewall surface, $T_{S2}$, of the tire, T, the first and second plurality of tire engaging portions 20, 22 functionally clamp the tire, T. Upon clamping the tire, T, between the first and second tire engaging portions 20, 22, rotational movement of the tire, T, about the axis, A-A, is substantially prevented.

Referring to FIG. 7, the claw portion 60 of the robotic arm 52 may rotate the wheel, W, relative the fixed, clamped positioning of the tire, T, according to the direction of the arrow, $R_W$. Rotation of the wheel, W, relative the tire, T, may be conducted to minimize an amount of weight added to the tire-wheel assembly in order to balance the tire-wheel assembly.

Figure 8:
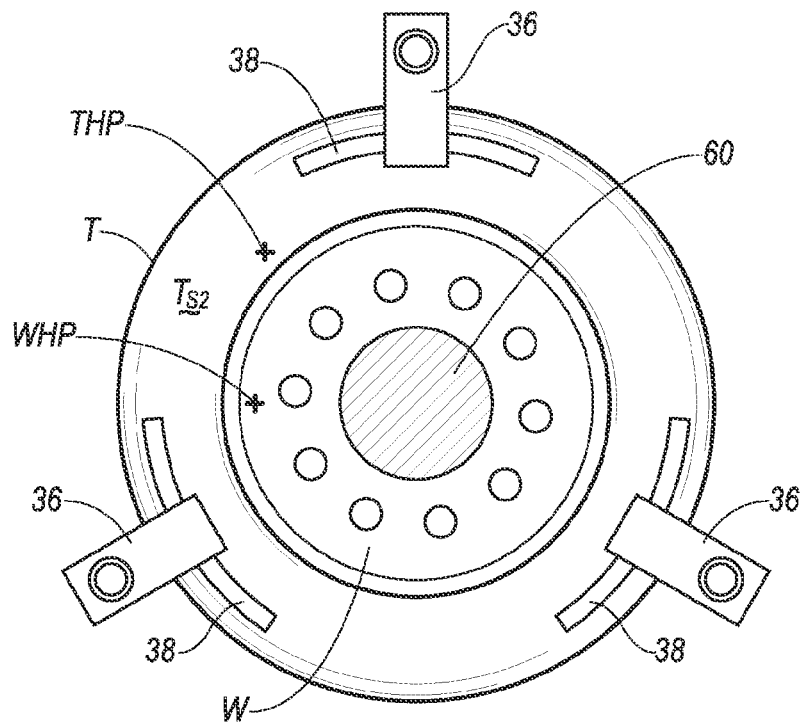
FIGS. 8 and 9 illustrate a top view of a tire and wheel as well as a partial overhead view of the sub-station of FIGS. 1-7 in accordance with an exemplary embodiment of the invention.
Figure 9:
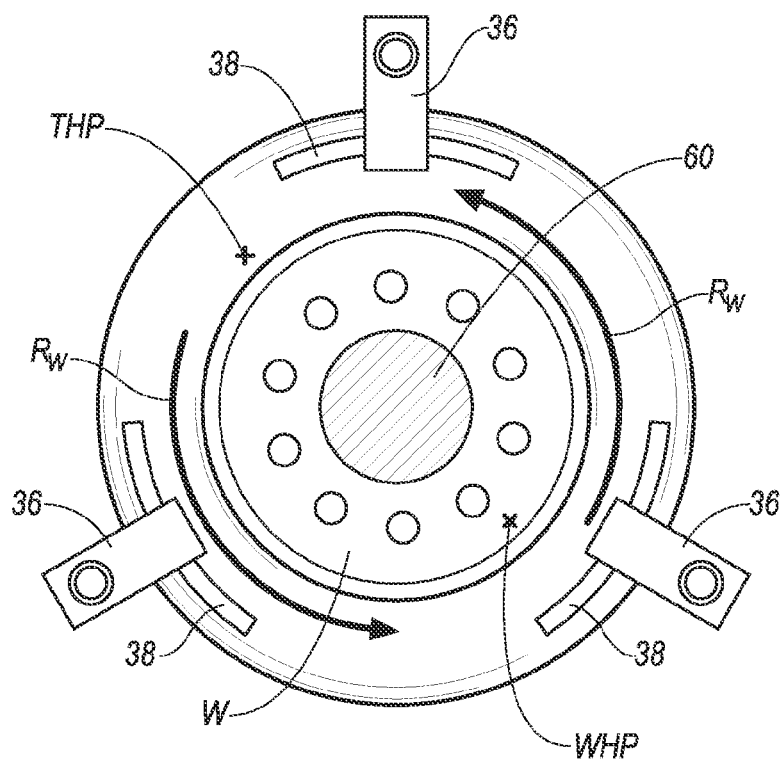

Referring to FIGS. 8 and 9, in an embodiment, a tire, T, may be marked with a heavy balance point, which is shown generally at THP, and the wheel, W, may be marked with a heavy balance point, which is shown generally at WHP. Accordingly, in an embodiment, the claw portion 60 may include, for example, an optical sensor that determines/detects both of the heavy balance points THP, WHP. Then, upon determining the location of the heavy balance points THP, WHP, the claw portion 60 may rotate the wheel, W, according to the direction of the arrow, $R_W$ (that is also shown in FIG. 7), such that the heavy balance points THP, WHP are offset from one another by approximately 180°, as seen, for example, in FIG. 9.

Figure 10:
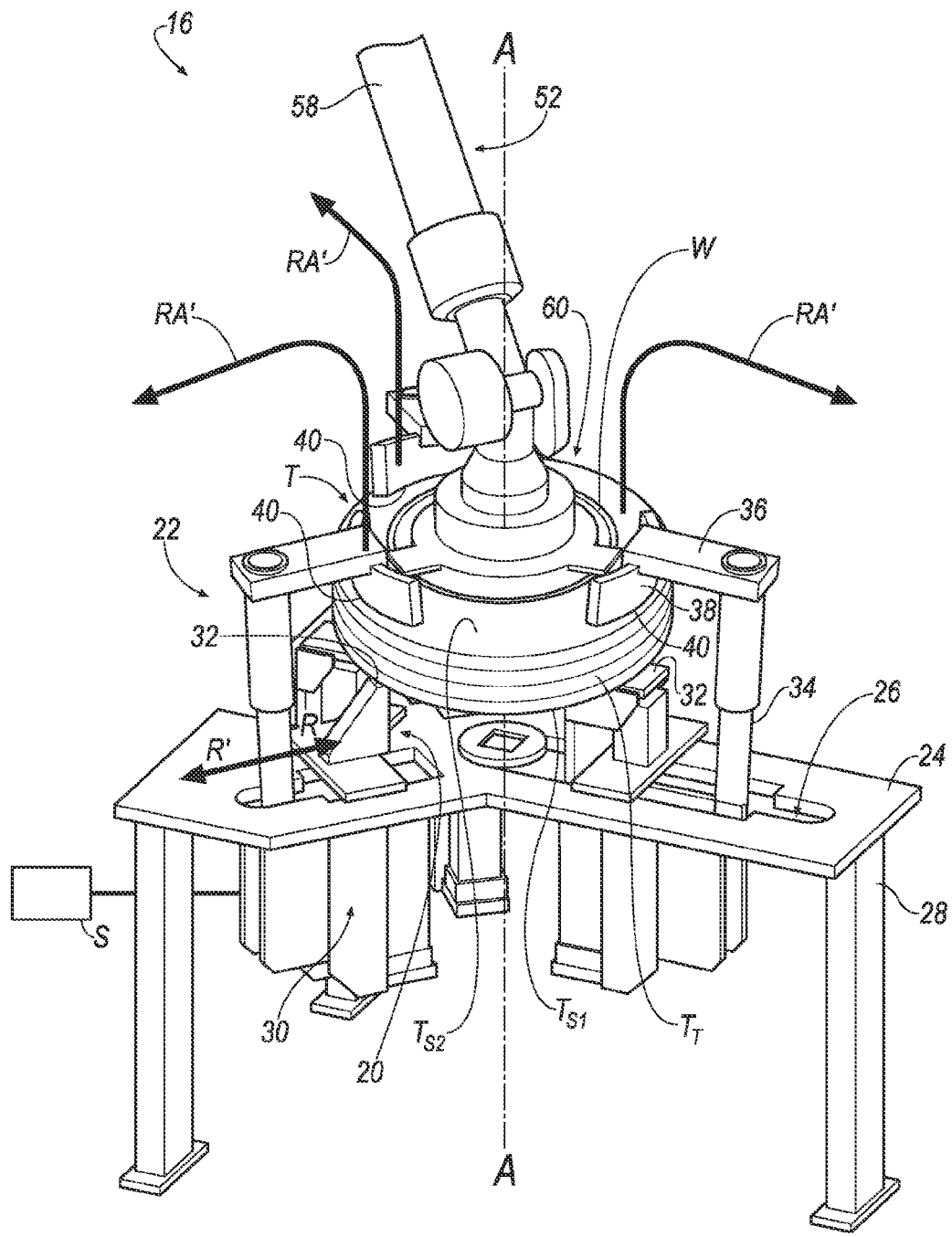
FIG. 10 illustrates the sub-station of the apparatus method according to FIGS. 1-9 in accordance with an exemplary embodiment of the invention.

As seen in FIG. 10, upon offsetting the heavy balance points THP, WHP approximately 180°, the second plurality of tire engaging portions 22 may be moved in a direction substantially opposite the direction of arrow, RA, which is shown generally at RA', such that the tire, T, is no longer clamped by the first and second plurality of tire engaging portions 20, 22. With the claw portion 60 still affixed to the wheel, W, the robotic arm 52 may move the non-inflated tire-wheel assembly to the inflating sub-station 18 for inflating the non-inflated tire-wheel assembly.

Although it has been described above that the tire, T, is prevented from rotating about the axis, A-A, as the wheel, W, is permitted to rotate about the axis, A-A, it will be appreciated that the invention is not limited to the above described methodology. For example, it will be appreciated that, in an alternative embodiment, one or more of the first and second plurality of tire engaging portions 20, 22 may clamp and rotate the tire, T, about the axis, A-A, as the robotic arm 52 retains the wheel, W, in a fixed position such that the wheel, W, is prevented from rotating about the axis, A-A. In order to permit the first and second plurality of tire engaging portions 20, 22 to rotate the tire, T, one or more components of the mounting and indexing sub-station 16 may be rotated about the axis, A-A, as the wheel, W, is held in an axially-fixed position by the robotic arm 52. Further, in an embodiment, it will be appreciated that both the tire, T, and wheel, W, may be rotated, in opposite directions, about the axis, A-A, such that the heavy balance points THP, WHP may be offset approximately 180°. Thus, it will be appreciated that either one of the tire, T, and wheel, W, may be fixed about the axis, A-A, while the other is rotatably-adjusted, or, alternatively, both of the tire, T, and wheel, W, may be rotatably-adjusted in opposite directions in order to offset the heavy balance points THP, WHP by approximately 180°.

Referring to FIGS. 11-19, a mounting and indexing sub-station 106 of a single-cell workstation for processing a tire-wheel assembly, TW, including a tire, T, and a wheel, W, is shown according to an embodiment. In an embodiment, a robotic arm is shown generally at 152 and includes, for example, an arm portion 158 and a claw portion 160. The robotic arm 152 is substantially similar to the robotic arm 52 described above, and, as such, the specific operation of the robotic arm 152 is not described in further detail. In an embodiment, the substation 106 also includes a platform 124 having a surface 126. In an embodiment, the platform 124 may be supported by legs 128.

In an embodiment, a plurality of dimples 130 extends axially away from the surface 126. In an embodiment, each dimple 130 is defined by a top surface, which is shown at 132. In an embodiment, one or more of the plurality of dimples 130 is defined to have a friction coefficient, k, that is greater than zero (i.e., k>0).

In an embodiment, the friction coefficient, k, that is greater than zero may be provided by forming the dimples 130 from a material that includes a friction coefficient greater than zero. Accordingly, in an embodiment, one or more of the plurality of dimples 130 may be formed from, for example, rubber, plastic, metal, wood, or the like.

Figure 12A:
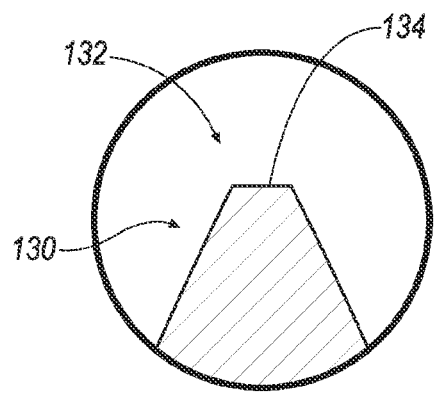
FIGS. 12A-12C illustrate embodiments of a dimple of the mounting and indexing substation of FIG. 11 in accordance with an exemplary embodiment of the invention.
Figure 12B:
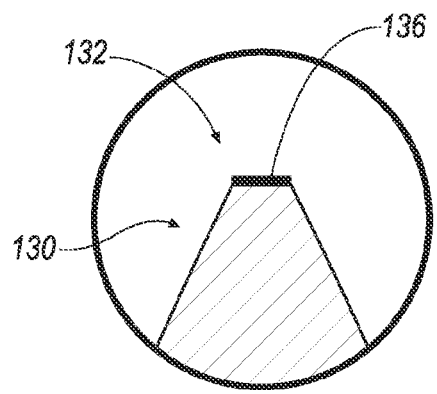
Figure 12C:
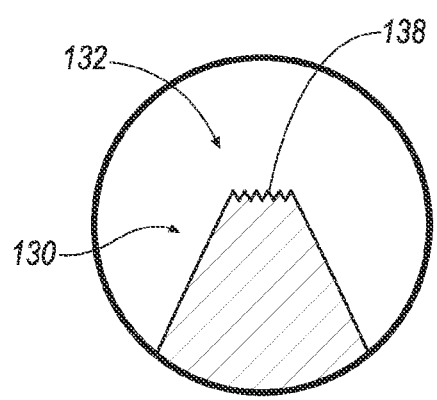

In addition to, or, alternatively, instead of a material defining the friction coefficient, k, in an embodiment, the friction coefficient, k, greater than zero may be provided by the structure of the plurality of dimples 130. Referring to FIGS. 12A-12C, an enlarged sectional view of the dimples 130 is shown according to an embodiment. As seen in FIG. 12A, in an embodiment, the top surface 132 may include a substantially flat surface 134. As seen in FIG. 12B, in an embodiment, the top surface 132 may include a coating of frictional, tacky material that is shown generally at 136. As see in FIG. 12C, in an embodiment, the top surface 132 may include a non-flat surface 138, such as, for example, a jagged, saw-tooth surface.

Figure 11:
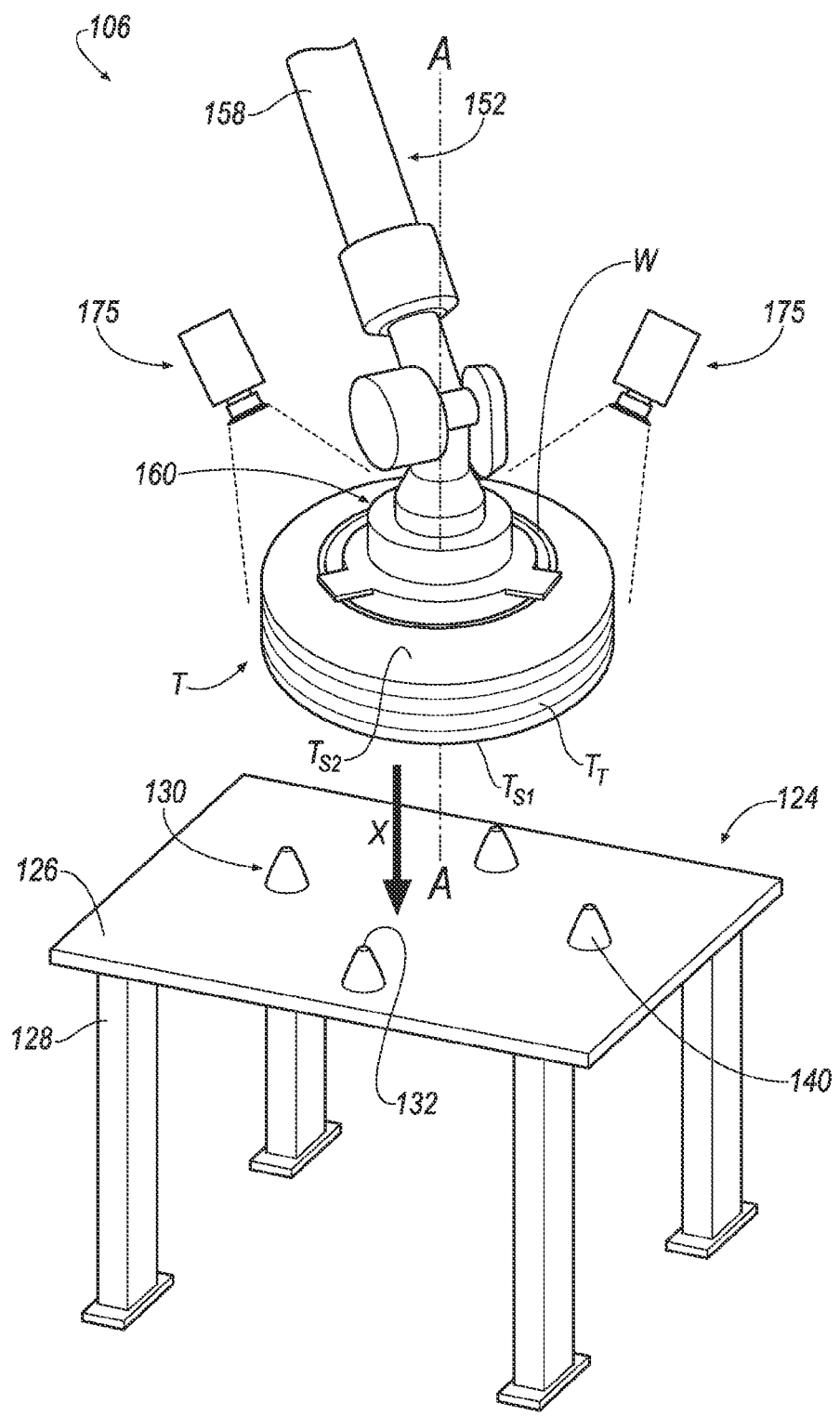
FIG. 11 illustrates a view of a mounting and indexing substation and a robotic arm in accordance with an exemplary embodiment of the invention.
Figure 13:
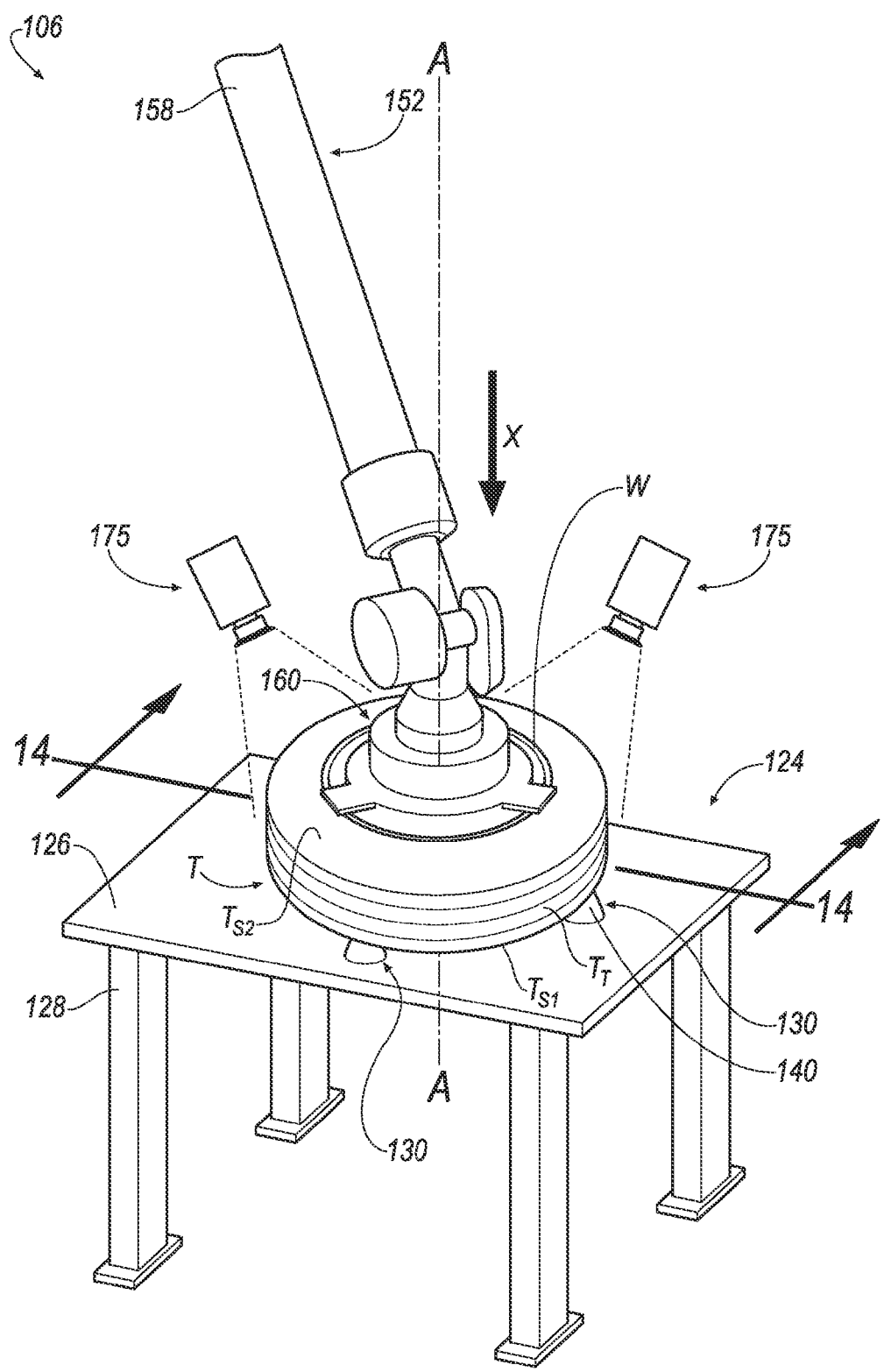
FIG. 13 illustrates another view of a mounting and indexing substation and a robotic arm in accordance with an exemplary embodiment of the invention.
Figure 14:
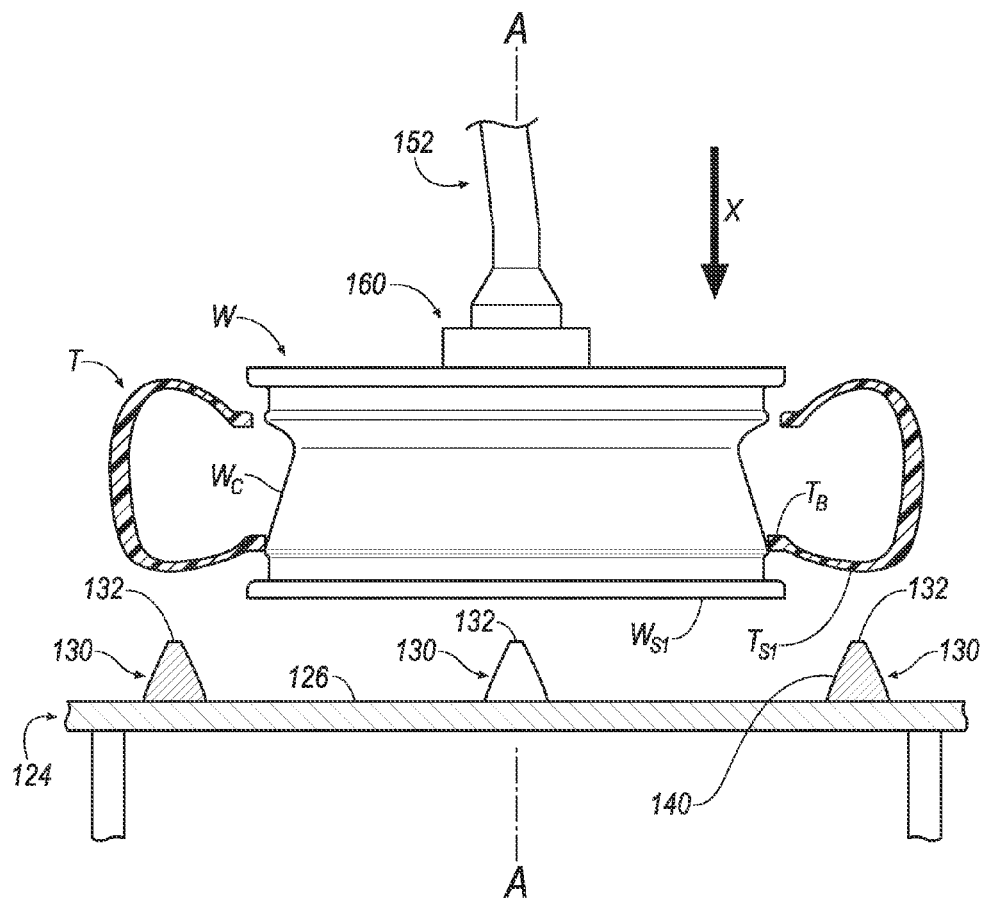
FIG. 14 illustrates a partial cross-sectional view of the mounting and indexing substation and a tire attached to the robotic arm in accordance with an exemplary embodiment of the invention.

In an embodiment the substation 106 may be operated as follows. Referring to FIG. 11, in an embodiment, the claw portion 160 retains the wheel, W, and the wheel, W, loosely-secures an un-inflated tire, T. Referring to FIGS. 13-14, the robotic arm 152 then locates the wheel, W, and tire, T, proximate the platform 124 by moving the wheel, W, and tire, T, according to the direction of the arrow, X, until the first sidewall surface, $T_{S1}$, of the tire, T, comes into contact with the top surface 132 of each of the plurality of dimples 130.

Figure 15:
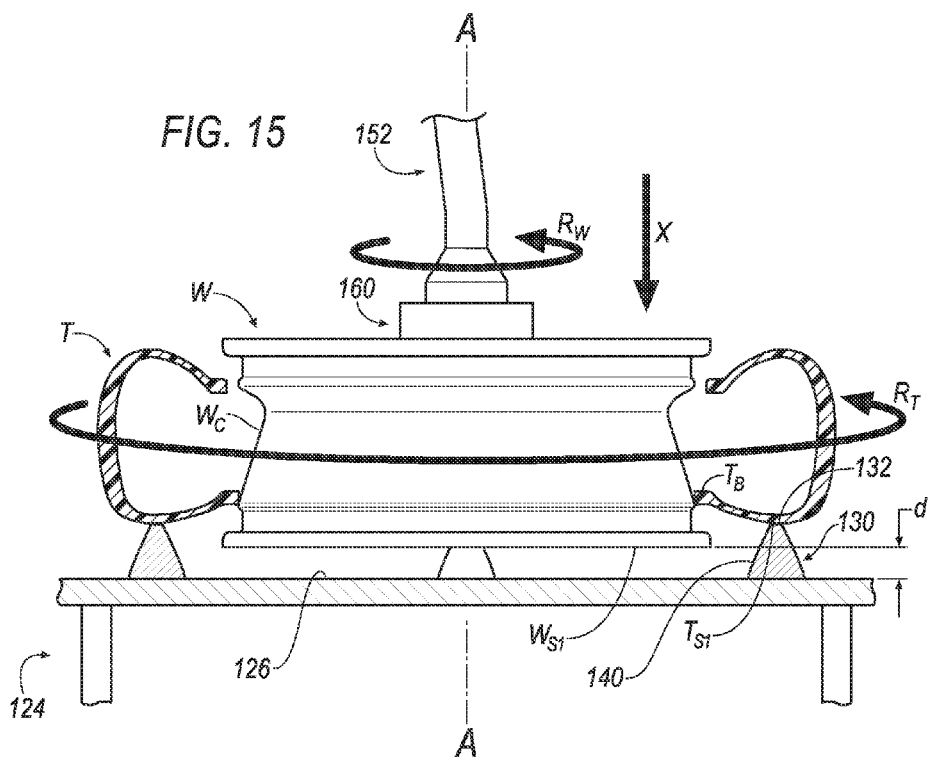
FIG. 15 illustrates another partial cross-sectional view of the mounting and indexing substation and a tire attached to the robotic arm in accordance with an exemplary embodiment of the invention.
Figure 16:
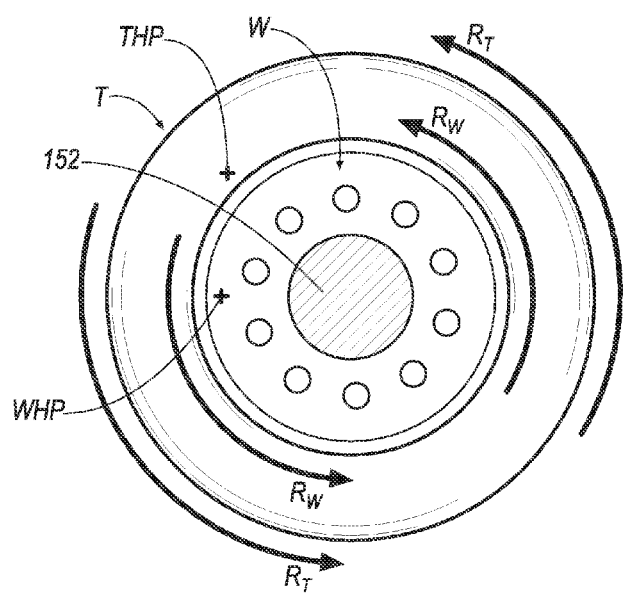
FIG. 16 illustrates a cross-sectional view of a portion of the robotic arm and a top view of the tire and a wheel in accordance with an exemplary embodiment of the invention.

As seen at FIG. 15, upon bringing the first sidewall surface, $T_{S1}$, of the tire, T, into contact with the top surface 132 of each of the plurality of dimples 130, a first sidewall surface, $W_{S1}$, of the wheel, W, is spaced from the surface 126 of the platform 124 at a distance, d. Further, as seen at FIG. 17, as the robotic arm 152 moves further according to the direction of the arrow, X, the distance, d, is further reduced.

Further, as seen at FIGS. 15-18, as the robotic arm 152 continues to move the wheel, W, and tire, T, according to the direction of the arrow, X, the robotic arm 152 rotates both of the wheel, W, and tire, T, according to the direction of arrows, $R_W$, $R_T$. As illustrated, the claw portion 160 is removably-affixed to the wheel, W, and a bead, $T_B$, of the tire, T, engages a circumference, $W_C$, of the wheel, W, such that rotation of the robotic arm 152 imparts rotation to the wheel, W, according to the direction of the arrow, $R_W$, which then imparts rotation to the tire, T, according to the direction of the arrow, $R_T$.

Figure 19:
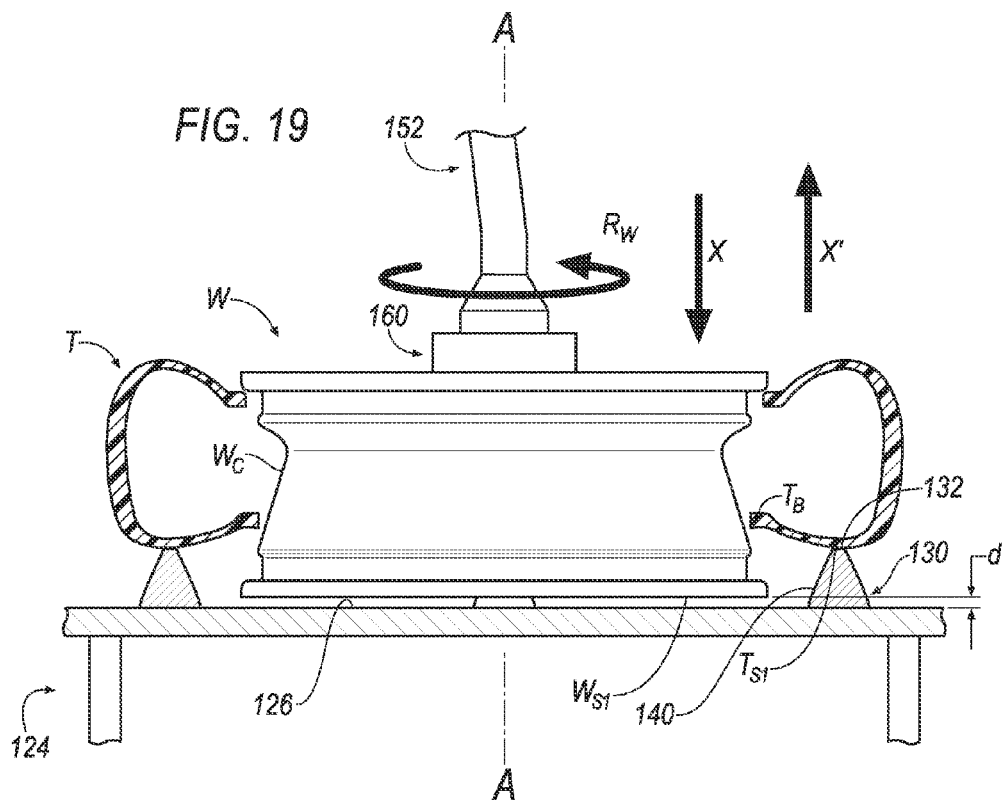
FIG. 19 illustrates another partial cross-sectional view of the mounting and indexing substation and a tire attached to the robotic arm in accordance with an exemplary embodiment of the invention.
Figure 20:
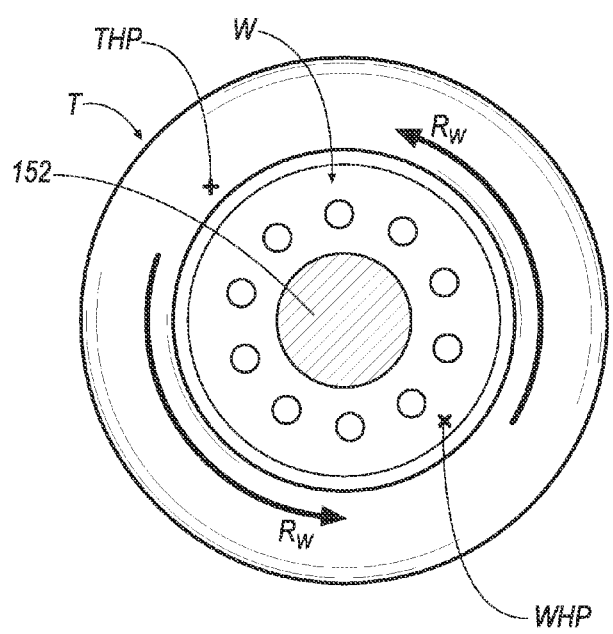
FIG. 20 illustrates another cross-sectional view of a portion of the robotic arm and a top view of the tire and a wheel in accordance with an exemplary embodiment of the invention.

Referring to FIGS. 19 and 20, upon further moving the robotic arm 152 according to the direction of the arrow, X, the distance, d, is further reduced until the first sidewall surface, $W_{S1}$, of the wheel, W, is located substantially adjacent, but at the distance, d, spaced from the surface 126 of the platform 124; accordingly, when positioned as shown at FIGS. 19 and 20, the bead, $T_B$, of the tire, T, no longer engages the circumference, $W_C$, of the wheel, W, such that rotation of the robotic arm 152 still imparts rotation to the wheel, W, according to the direction of the arrow, $R_W$, while no longer imparting rotation to the tire, T, according to the direction of the arrow, $R_T$. Thus, the tire, T, is no longer engaged with the wheel, W, but rather, is supported upon the top surface 132 of the plurality of dimples 130 in rotationally-fixed position while the wheel, W, may be rotatably-retrained by the robotic arm 152. It will be appreciated, however, in an embodiment, that the frictional constant, k, assists in preventing or substantially reducing rotation of the tire, T, when the wheel, W, is positioned according to that as shown in FIGS. 15-20.

Once positioned as described above in FIGS. 19-20, an imaging system 175 (see, e.g., FIGS. 11 and 13) of the substation 106 may be utilized to identify the tire's marked heavy balance point, which is shown generally at THP, and the wheel's marked heavy balance point, which is shown generally at WHP. Because the tire, T, is no longer rotatable, the imaging system 175 may monitor the relationship of the marked points, THP, WHP, in order to identify when the marked points, THP, WHP, are offset from one another by approximately 180°.

Accordingly, when the robotic arm 152 has rotated the wheel, W, about the tire, T, to a position when the marked points, THP, WHP, are offset from one another by approximately 180° (see, e.g., FIG. 20), the imaging system 175 may send a signal to the robotic arm 152 in order to instruct the robotic arm 152 to cease the rotation of the wheel, W. Once the rotation of the wheel, W, has ceased, the robotic arm 152 may be moved according to the direction of the arrow, X' (see, e.g., FIG. 19), that is substantially opposite the direction of the arrow, X, such that the wheel, W, and tire, T, are removed from the platform 124 with heavy balance points, THP, WHP, of the tire, T, and wheel, W, offset from each other by approximately 180°.

In order to permit the above-described function of the substation 106, it will be appreciated that the arrangement of the plurality of dimples 130 be spaced from the axis, A-A, in a desired manner. As illustrated, for example, in FIG. 19, the location where a sidewall surface 140 of the plurality of dimples 130 extend from the surface 126 of the platform should be radially spaced from the axis, A-A, at a distance greater than that of the radius of the wheel, W; as illustrated, in order to permit the wheel, W, to be positioned at the distance, d, that is substantially adjacent the surface 126 of the platform 124, the wheel, W, should not engage the plurality of dimples 130. Thus, the dimples may not interfere with the axial movement of the wheel, W, such that the dimples 130 function by axially offsetting the location of the tire, T, with respect to the wheel, W, in order to terminate the rotation of the tire, T, with that of the wheel, W.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A single-cell workstation for processing a tire-wheel assembly including a tire and a wheel, comprising:
   a mounting and indexing sub-station including:
      a platform including a plurality of tire-sidewall-surface-engaging members that are non-movably-fixed to and extend away from a top surface of the platform, wherein each tire-sidewall-surface-engaging member of the plurality of tire-sidewall-surface-engaging members is spaced at a distance from an axis extending through the platform, wherein the distance is greater than that of a radius of the wheel; and means for identifying a spatial relationship of the heavy balance point of the tire and the heavy balance point of the wheel in order to identify when the heavy balance point of the tire and the heavy balance point of the wheel are offset from one another by approximately 180°.

2. The single-cell workstation according to claim 1 further comprising:
a robotic arm indirectly connected to the plurality of tire-sidewall-surface-engaging members by way of the tire-wheel assembly that is connected to the robotic arm.

3. The single-cell workstation according to claim 2, wherein the wheel of the tire-wheel assembly is joined to a distal end of the robotic arm, wherein the tire is non-inflatably-arranged about the wheel such that the wheel is arranged within the opening of the tire.

4. The single-cell workstation according to claim 3, wherein the robotic arm is positioned proximate the mounting and indexing sub-station such that a sidewall surface of the tire is disposed directly adjacent an upper surface of each tire-sidewall-surface-engaging member of the plurality of tire-sidewall-surface-engaging members.

5. The single-cell workstation according to claim 4, wherein the wheel is spatially manipulatable by the robotic arm relative to a spatially-fixed orientation of the tire that is disposed directly adjacent the upper surface of each tire-sidewall-surface-engaging member of the plurality of tire-sidewall-surface-engaging members for offsetting a heavy balance point of the tire and a heavy balance point of the wheel.

6. The single-cell workstation according to claim 5, wherein the upper surface of each tire-sidewall-surface-engaging member of the plurality of tire-sidewall-surface-engaging members is defined by a coefficient of friction greater than zero for impairing movement of the tire relative to the plurality of tire-sidewall-surface-engaging members as the robotic arm spatially manipulates the wheel relative to the tire.

7. The single-cell workstation according to claim 5, wherein the upper surface includes
a coating of tacky material.

8. The single-cell workstation according to claim 5, wherein the upper surface includes
a saw-tooth configuration.

9. The single-cell workstation according to claim 5, wherein the plurality of tire-sidewall-surface-engaging members includes
rubber, plastic, metal or wood.

10. A single-cell workstation for processing a tire-wheel assembly including a tire and a wheel, comprising:
a mounting and indexing sub-station including
a platform including
a plurality of tire engaging portions, wherein the plurality of tire-engaging portions extend axially away from a surface of the platform, wherein the tire-engaging portions are defined by
a plurality of dimples having a top surface having a coefficient of friction greater than zero, and
means for identifying a spatial relationship of the heavy balance point of the tire and the heavy balance point of the wheel in order to identify when the heavy balance point of the tire and the heavy balance point of the wheel are offset from one another by approximately 180°.

11. The single-cell workstation according to claim 10, wherein the top surface includes a coating of tacky material.

12. The single-cell workstation according to claim 10, wherein the top surface includes a saw-tooth configuration.

13. The single-cell workstation according to claim 10, wherein the plurality of dimples includes rubber, plastic, metal or wood.

14. The single-cell workstation according to claim 10, wherein the top surface is disposed adjacent a sidewall surface of the tire for preventing rotation of the tire as the wheel is rotated relative the tire.

15. The single-cell workstation according to claim 10, wherein the top surface of the plurality of dimples having the coefficient of friction greater than zero contributes to terminating rotationally-imparted movement to the tire from rotational movement imparted to the wheel for offsetting a location of the tire with respect to the wheel.

16. The single-cell workstation according to claim 10, wherein
a sidewall surface of the plurality of dimples is radially spaced from an axis at a distance greater than that of a radius of the wheel.

* * * * *